Уnited States Patent Office 3,193,416
Patented July 6, 1965

3,193,416
PROCESS OF DYEING ANODIZED ALUMINUM
Christian E. Michelson, Hamden, Conn., assignor to Olin Mathieson Chemical Corporation
No Drawing. Filed Sept. 10, 1962, Ser. No. 222,654
5 Claims. (Cl. 148—6.1)

The present invention relates to a process for coloring anodized aluminum. More particularly, the present invention resides in a novel process which enables the application of vat dyes to anodized aluminum.

Vat dyes represent a large class of dyestuffs which are not normally used to color anodized aluminum. As a class they show little or no solubility in water or in the common organic solvents. Structurally they differ from the soluble dyes in that they do not contain any solubilizing groups, such as $SO_3Na$. It is highly desirable to devise a process which enables the use of these materials since they are more pigment-like than the conventional dyestuffs, and therefore, would be expected to remain in the anodized aluminum without bleeding during the sealing operation. In addition, the utilization of vat dyes broadens the spectrum of available dyes for aluminum, some of which have excellent fading characteristics with respect to light.

Accordingly, it is an object of the present invention to provide a process of coloring anodized aluminum utilizing vat dyes.

It is a still further object of the present invention to provide a process as aforesaid which is convenient, expeditious and inexpensive and provides a colored product having excellent characteristics.

Further objects and advantages of the present invention will appear hereinafter.

In accordance with the process of the present invention it has now been found that the foregoing objects and advantages may be readily accomplished. The process of the present invention relates to coloring anodized aluminum with a dye followed by sealing the dye in the aluminum oxide coating, and specifically the improvement of the present invention comprises employing a dye solution containing a vat dye in the leuco ester form and dimethyl sulfoxide.

It is surprising and unexpected to find that vat dyes may be so readily and conveniently employed in accordance with the process of the present invention. This is especially surprising since vat dyes are not normally used to color anodized aluminum and processes using vat dyes to color anodized aluminum are generally cumbersome, inconvenient and characterized by a plurality of process steps thus resulting in a prohibitively expensive process. The excellent results obtained with the simple process of the present invention are further surprising and unexpected.

The process of the present invention relates to coloring anodized aluminum with a dye followed by sealing the dye in the aluminum oxide coating. The aluminum may be anodized in accordance with conventional art procedures. Generally, the longer anodic treatment develops thicker aluminum oxide coatings and these thicker coatings will accept more intense dye colors.

The color is fixed or sealed in the anodized material in the conventional manner. This fixing or sealing operation is performed after the dye solution is applied to the aluminum oxide coating and after the leuco ester is oxidized to the insoluble vat form. Conventional fixing or sealing procedures are employed, such as by immersion in water or the use of steam for a sufficient length of time to render the anodic coating non-stainable.

The process of the present invention is extremely versatile in that any vat available in the powdered, stabilized leuco form may be readily and conveniently employed. The vat dye is utilized in its leuco ester form and after application to the aluminum oxide, the leuco ester form of the dye is oxidized to the insoluble vat form of the dye. The use of dimethyl sulfoxide in the present invention provides the added solvent power for these dyes which water is unable to provide.

It is esepecially useful to utilize saturated solutions of the leuco ester in the dye solution; however, it should be understood that saturated solutions or less than saturated solutions of the dye may be conveniently employed.

Typical and illustrative vat dyes include, but are not limited to, the following: General Dyestuff Company dyes, Green IBW (C.I. 1101), Violet IRRN, Yellow GC, Blue IBC (C.I. 1113), Pink IR, Black IB, Scarlet HB, Grey IBL, Blue O (C.I. 1177), Brown IBR, Red IFBB, Orange HR (C.I. 1217), Violet 14R (C.I. 1104), Yellow IGR, Brown IRRD, and Blue 04B (C.I. 1184). The C.I. numbers above are the numbers listed in Colour Index, second edition.

In accordance with the process of the present invention the dye solution is prepared by dissolving the leuco ester form of the vat dye in dimethyl sulfoxide and applying this solution to the anodized aluminum. The total solvent component may consist of the dimethyl sulfoxide or varying proportions of compatible solvents may be added to the solution.

After the dye solution has been applied to the anodized aluminum, the solvent component is evaporated leaving the coating impregnated with the leuco ester form of the vat dye. The coated anodized aluminum object is then immersed in an acid bath containing an oxidizing agent, thereby oxidizing the leuco ester to the insoluble form of the dye. The article is then sealed in the conventional manner. Alternatively, the dye solution can be prepared containing the oxidizing agent therein and the development of the vat color can be made in an acid bath containing no oxidizing agent. Another alternative is the impregnation of the coating with the dye solution with or without the oxidizing agent followed by exposure of the object to a source of ultraviolet light, for example, sun light. The exposure to ultraviolet light results in oxidation of the leuco ester to the insoluble vat form of the dye. When this procedure is employed the object can be sealed without the acid bath treatment. Alternatively, a photographic negative is interposed between the light source and coating, which results in a color distribution determined by the negative density.

In accordance with the process of the present invention, the application of dye solution to the anodized aluminum may be accomplished by a variety of methods, such as painting, printing, spraying or dipping. It is preferred to conduct the dyeing procedure at ambient temperatures; however, higher or lower temperatures may be conveniently employed. When the dye is carried out by immersing the anodized aluminum in the dye solution the time of immersion is not critical. The coated anodized aluminum may be immersed in the dye solution for from 5 seconds to 30 minutes or more depending upon the particular color desired.

Oxidation of the leuco ester form of the vat dye may be accomplished by contacting the leuco ester with an oxidizing agent and thereby oxidizing the leuco ester to the insoluble form of the dye. Any oxidizing agent may be employed. Sodium nitrite has been found to be particularly effective; however, air oxidation, light and other oxidizing agents commonly used in the art of textile dyeing, which do not attack aluminum, may be conveniently employed.

The present invention will be more readily apparent from a consideration of the following illustrative examples.

EXAMPLES 1–16

Saturated solutions of the leuco ester form of the vat dye in dimethyl sulfoxide solvent were prepared by dissolving the leuco ester form of the desired dye in dimethyl sulfoxide. The dye soultion was applied to the anodized, unsealed aluminum by a variety of methods, including brushing, dipping and spraying. The solvent was then allowed to evaporate in a 100° F. oven and the coated article was immersed in a solution of 1 percent sulfuric acid containing 1 percent sodium nitrite. After five minutes the panel was sealed by immersion in boiling water. No sign of coloration was observed in the sealing water and the results were uniformly good. The dyes used are shown in the following table. The depth of color attained varied according to the particular dye employed and the thickness of the anodic coating applied to the metal.

*Table 1*

| Example No. | Dye Used [1] |
|---|---|
| 1 | Green IBW. |
| 2 | Violet IRRN. |
| 3 | Yellow GC. |
| 4 | Blue IBC. |
| 5 | Pink IR. |
| 6 | Black IB. |
| 7 | Scarlet HB. |
| 8 | Grey IBL. |
| 9 | Blue O. |
| 10 | Brown IBR. |
| 11 | Red IFBB. |
| 12 | Orange HR. |
| 13 | Violet 14R. |
| 14 | Yellow IGR. |
| 15 | Brown IRRD. |
| 16 | Blue 04B. |

[1] General Dyestuff Company dyes.

EXAMPLE 17

Examples 1 through 16 were repeated with the exception that 1 percent sodium nitrite was added to the dye solution and no sodium nitrite was added to the 1 percent sulfuric acid solution. Similar good results were obtained.

EXAMPLE 18

Examples 1 through 16 were repeated with the exception that the panel was exposed to sunlight to develop the color instead of immersion in sulfuric acid-nitrite bath. The time of exposure was regulated according to the color desired. In some cases a photographic negative was interposed between the light source and coating. In all cases uniformly good results were obtained.

This invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

What is claimed is:

1. In the process of coloring anodized aluminum with a dye followed by sealing the dye in the aluminum oxide coating, the improvement which comprises, applying to the anodized aluminum a dye solution containing a vat dye in the leuco ester form and a dimethyl sulfoxide solvent, and oxidizing the leuco ester to the insoluble form.

2. A process for coloring anodized aluminum which comprises: (1) applying to the anodized aluminum a dye solution containing a vat dye in the leuco ester form and a dimethyl sulfoxide solvent; (2) evaporating the solvent; (3) contacting the leuco ester with an oxidizing agent under acid conditions and thereby oxidizing the leuco ester to the insoluble form of the dye; and (4) sealing the color in the aluminum oxide coating.

3. A process for coating anodized aluminum which comprises: (1) applying to the anodized aluminum a dye solution containing a saturated solution of a vat dye in the leuco ester form in a dimethyl sulfoxide solvent and an oxidizing agent; (2) evaporating the solvent; (3) immersing the coated anodized aluminum in an acid bath; and (4) sealing the color in the aluminum oxide coating.

4. A process according to claim 1 wherein the leuco ester is oxidized to the insoluble vat form by contacting said leuco ester with ultraviolet light.

5. A process according to claim 4 wherein a photographic negative is interposed between the light source and the coating.

References Cited by the Examiner

UNITED STATES PATENTS

| 2,132,620 | 10/38 | Hill et al. | 148—6.1 |
| 2,182,964 | 12/39 | Dreyfus et al. | 8—35 |
| 2,214,365 | 9/40 | Flynn et al. | 8—35 X |
| 2,478,954 | 8/49 | Tuttle et al. | 148—6.1 |
| 2,872,277 | 2/59 | Kirk | 8—35 X |
| 3,019,143 | 1/62 | Dessauer | 148—6.1 |
| 3,066,054 | 11/62 | McNamara | 148—6.1 |
| 3,077,425 | 2/63 | Fromson | 148—6.1 |

FOREIGN PATENTS

| 835,680 | 4/52 | Germany. |

OTHER REFERENCES

Kirillov et al.: Metal Industry, January 11, 1952, pp. 31–33.

RICHARD D. NEVIUS, *Primary Examiner.*

WILLIAM D. MARTIN, *Examiner.*